(12) United States Patent
Matsuura (10) Patent No.: US 7,742,549 B2
(45) Date of Patent: Jun. 22, 2010

(54) DUAL-POLARIZATION RECEIVER

(75) Inventor: Toru Matsuura, Tokyo (JP)

(73) Assignee: NEC Corporation, Tokyo (JP)

( * ) Notice: Subject to any disclaimer, the term of this patent is extended or adjusted under 35 U.S.C. 154(b) by 1145 days.

(21) Appl. No.: 11/324,332

(22) Filed: Jan. 4, 2006

(65) Prior Publication Data
US 2006/0148431 A1 Jul. 6, 2006

(30) Foreign Application Priority Data
Jan. 5, 2005 (JP) ............................. 2005-000315

(51) Int. Cl.
*H04B 7/10* (2006.01)
*H04L 1/02* (2006.01)
(52) U.S. Cl. ......................... 375/347; 375/346; 398/65
(58) Field of Classification Search ................. 375/346, 375/347; 389/65
See application file for complete search history.

(56) References Cited
U.S. PATENT DOCUMENTS
4,879,711 A * 11/1989 Rosen ........................ 370/325
4,926,422 A * 5/1990 Alaria et al. ................ 370/323
2002/0061752 A1* 5/2002 Kurokami .................... 455/447
2006/0274320 A1* 12/2006 Caplan ........................ 356/491

FOREIGN PATENT DOCUMENTS

| JP | 64-51839 A | 2/1989 |
|----|------------|--------|
| JP | 03-30044 A | 2/1991 |
| JP | 6-232787 A | 8/1994 |
| JP | 09-204240 A | 8/1997 |
| JP | 2682514 B2 | 8/1997 |
| JP | 3044633 B2 | 3/2000 |
| JP | 2002-158630 A | 5/2002 |
| JP | 2004-172975 A | 6/2004 |

* cited by examiner

*Primary Examiner*—Curtis B Odom
(74) *Attorney, Agent, or Firm*—Sughrue Mion, PLLC (57) ABSTRACT

A dual-polarization receiver for receiving polarized wave signals whose directions are different from each other has receiving demodulation units of a working system and a backup system for one of the polarized wave signals, and receiving demodulation units of a working system and a backup system for the other of the polarized wave signals. RF local oscillation circuits of frequency converting circuits of the working system are connected with a common REF oscillation circuit and RF local oscillation circuits of frequency converting circuits of the backup system are connected with a common REF oscillation circuit.

13 Claims, 5 Drawing Sheets

DUAL-POLARIZATION RECEIVER

BACKGROUND OF THE INVENTION

1. Field of the Invention

The present invention relates to a dual-polarization receiver, and more specifically to a dual-polarization receiver for receiving polarized wave signals whose directions are different from each other.

2. Related Art

In a communication system in the cross-polarization hot standby scheme according to Japanese Patent No. 3044633, either a horizontal polarized wave (H polarized wave) or a vertical polarized wave (V polarized wave) is used as a working system (active system) and the other is used as a backup system (standby system).

Therefore, in the communication system according to Japanese Patent No. 3044633, capacity which can be transmitted by using a single frequency is limited to capacity which can be transmitted by a single wireless communication device. As interference between cross polarized waves occurs even in a stationary state (both V and H dual polarized waves are in stationary states), an antenna with a high degree of identifying polarized waves or a polarized wave identification circuit need to be used. As C/N (Carrier to Noise) characteristics need to be large enough as the modulating scheme becomes multi-valued modulating scheme (for example, 128 QAM (Quadrature Amplitude Modulation) or the like), the configuration of the communication system according to Japanese Patent No. 3044633, in which interference between cross polarized waves looks like noise, has a problem in that it provides insufficient system gain, i.e., it does not assure usual link quality.

In order to reduce interference between cross polarized waves, a cross polarization interference canceller according to Japanese Patent Laid-Open No. 2004-172975 and 2002-158630, for example, may be used. The Japanese Patent Laid-Open No. 2004-172975 and 2002-158630, however, describes no remedy for malfunctions of a device.

Japanese Patent Laid-Open No. 6-232787 describes a remedy with 2+N configuration, in which two links are prepared as backup links. With 2+N configuration, however, frequency utilization efficiency is very low particularly when N is small.

BRIEF SUMMARY OF THE INVENTION

The object of the present invention is to provide a dual-polarization receiver in a hot standby transmission scheme using dual polarized wave signal transmission that has high frequency-utilizing-efficiency.

A dual-polarization receiver according to the present invention is a dual-polarization receiver for receiving polarized wave signals whose directions are different from each other, including receiving demodulation units of a working system and a backup system for each of the polarized wave signals.

The dual-polarization receiver, wherein each of the receiving demodulation units includes a frequency converting circuit for converting an inputted polarized wave signal to an intermediate frequency signal, and a demodulation circuit for demodulating an output signal from the frequency converting circuit of the receiving demodulation unit and cancelling interference between the polarized waves by receiving the output signal from the frequency converting circuit of the receiving demodulation unit and the output signal from the frequency converting circuit of the receiving demodulation unit of the same system as the receiving demodulation unit among the receiving demodulation units provided for the polarized wave signal different from that of the receiving demodulation unit.

The dual-polarization receiver, wherein local oscillation signals used for the frequency converting circuits of the receiving demodulation units are common.

The dual-polarization receiver, wherein each of the frequency converting circuits of the receiving demodulation units has a local oscillation circuit for outputting the local oscillation signal, and the local oscillation circuits of the frequency converting circuits of the receiving demodulation units are connected with a common reference oscillation circuit and are synchronized.

The dual-polarization receiver, including first switching means for supplying one of the outputs from the frequency converting circuits of the receiving demodulation units of the working system and the backup system provided for one of the polarized wave signals to the demodulation circuits of the receiving demodulation units of the working system and the backup system provided for the other of the polarized wave signals, and supplying one of the outputs from the frequency converting circuits of the receiving demodulation units of the working system and the backup system provided for the other of the polarized wave signals to the demodulation circuits of the receiving demodulation units of the working system and the backup system provided for the one of the polarized wave signals, wherein the demodulation circuit of each of the receiving demodulation units receives the output signal from the frequency converting circuit of the receiving demodulation unit and the output signal supplied from the first switching means.

According to the present invention, as a dual-polarization receiver for receiving polarized wave signals whose directions are different from each other is adapted to have receiving demodulation units of a working system and a backup system for each of the polarized wave signals, frequency-utilization-efficiency can be higher in the present invention than in the configuration in which one of the polarized wave signals is used for a working system and the other is used for a backup system.

By using a common local oscillation signal for the frequency converting circuits of the receiving demodulation units, the present invention can realize synchronization of a radio frequency in the frequency converting circuits of the receiving modulation units. As the first switching means supplies one of the outputs from the frequency converting circuits of the receiving demodulation units of the working system and the backup system provided for one of the polarized wave signals to the demodulation circuits of the receiving demodulation units of the working system and the backup system provided for the other of the polarized wave signals, and supplies one of the outputs from the frequency converting circuits of the receiving demodulation units of the working system and the backup system provided for the other of the polarized wave signals to the demodulation circuits of the receiving demodulation units of the working system and the backup system provided for the one of the polarized wave signals, compensating operation of interference between the polarized waves in each demodulation circuit can operate correctly even if the receiving demodulation unit of the working system for one of the polarized wave signals is switched to the receiving demodulation unit of the backup system for the one of the polarized wave signals and the receiving demodulation unit of the working system for the other of the polarized wave signals is not switched to the backup system and kept used due to failure of the frequency converting circuit of the receiving demodulation unit of the working system for the one of the polarized wave signals.

DETAILED DESCRIPTION OF THE PREFERRED EMBODIMENTS

A first embodiment of the present invention will be described below with reference to the drawings.

Figure 1:
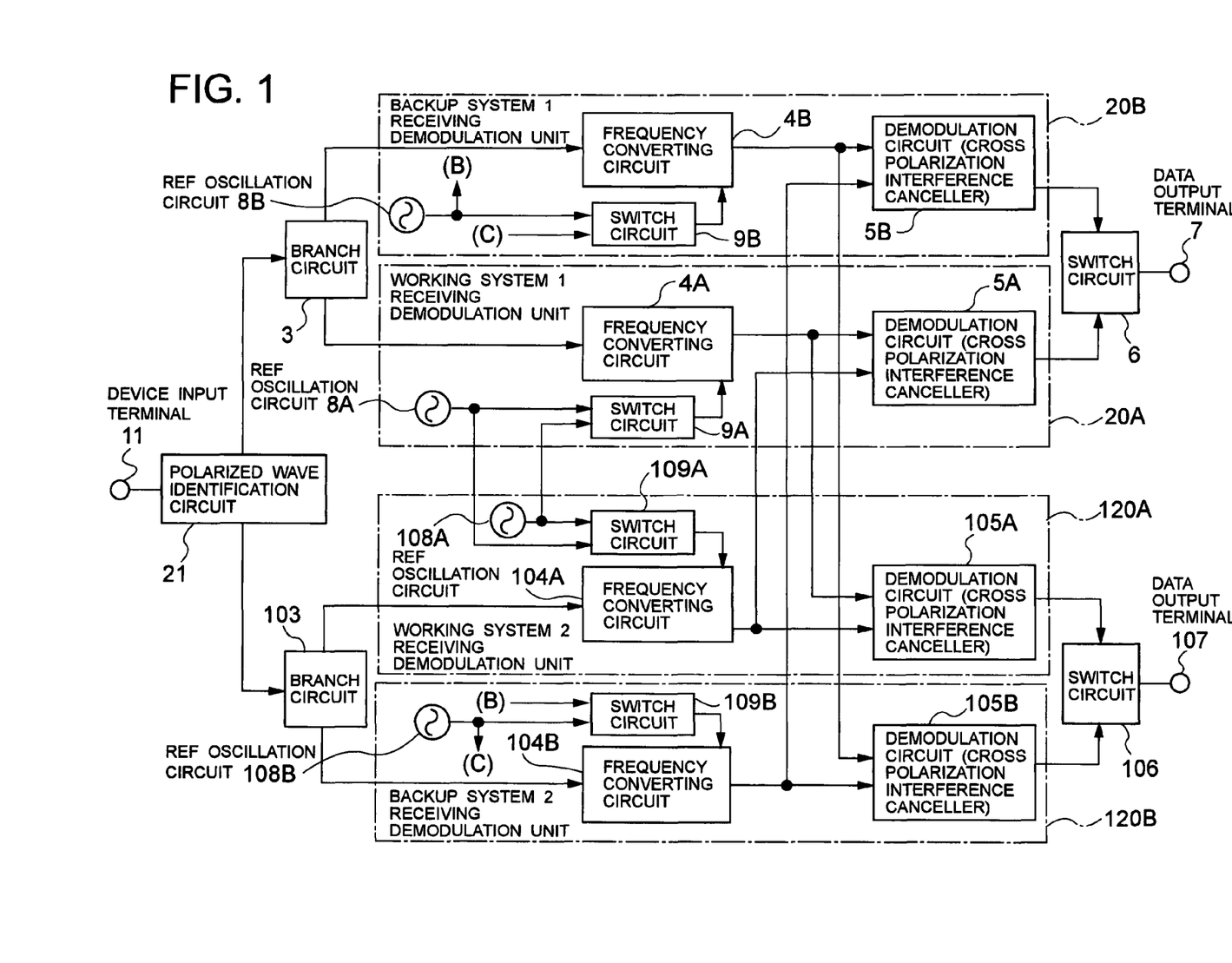
FIG. 1 is a diagram showing configuration of a dual-polarization receiver according to the first embodiment of the present invention.

FIG. 1 is a diagram showing configuration of a dual-polarization receiver in a hot standby transmission scheme using dual-polarized wave signal transmission according to the first embodiment of the present invention. The dual-polarization receiver according to the first embodiment of the present invention has a device input terminal 11, a polarized wave identification circuit 21, branch circuits 3 and 103, a receiving demodulation unit 20A of a working system 1, a receiving demodulation unit 20B of a backup system 1, a receiving demodulation unit 120A of a working system 2, a receiving demodulation unit 120B of a backup system 2, switch circuits 6 and 106, and data output terminals 7 and 107.

The polarized wave identification circuit 21 inputs signals transmitted with two polarized waves (V polarized wave/H polarized wave), which are orthogonal to each other, from the device input terminal 11 and outputs one of the V polarized wave signal and H polarized wave signal to the branch circuit 3 and the other to the branch circuit 103. Each of the branch circuits 3 and 103 divides the input signal into two branches and outputs them.

The receiving demodulation units 20A, 20B, 120A and 120B have the same configuration. That is to say, each of the units has a frequency converting circuit (4A, 4B, 104A or 104B) and a demodulation circuit (5A, 5B, 105A or 105B) with a cross polarization interference canceller.

REF (Reference) oscillation circuits 8A, 8B, 108A and 108B and switch circuits 9A, 9B, 109A and 109B in the receiving demodulation units 20A, 20B, 120A and 120B may be provided for outside the receiving demodulation units 20A, 20B, 120A and 120B.

The switch circuits 9A and 109A supply output (reference signal) from either the REF oscillation circuits 8A or 108A to the frequency converting circuits 4A and 104A. That is to say, the frequency converting circuits 4A and 104A are supplied with output from the same REF oscillation circuit. Similarly, the switch circuits 9B and 109B supply output (reference signal) from either the REF oscillation circuits 8B or 108B to the frequency converting circuits 4B and 104B. That is to say, the frequency converting circuits 4B and 104B are supplied with output from the same REF oscillation circuit.

Each of the frequency converting circuits 4A, 4B, 104A and 104B has an RF (Radio Frequency) local oscillation circuit (not shown) for outputting a local oscillation signal with the reference signal as an input, and converts an input signal from the branch circuit into an intermediate frequency signal and outputs the signal. As mentioned above, the RF local oscillation circuits of the frequency converting circuits 4A and 104A are connected to the common REF oscillation circuit and are synchronized. The RF local oscillation circuits of the frequency converting circuits 4B and 104B are also connected to the common REF oscillation circuit and are synchronized.

Each of the demodulation circuits 5A, 5B, 105A and 105B demodulates an output signal from the frequency converting circuit at the previous step, and cancels interference between cross polarized waves by using an output signal from the frequency converting circuit of the receiving demodulation unit on the different polarized wave side as a reference signal (for example, for the demodulation circuit 5A, using an output signal from the frequency converting circuit 104A as a reference signal for cancelling interference between cross polarized waves). Each of the switch circuits 6 and 106 outputs one of the outputs from the receiving demodulation units of the working system and backup system to the data output terminal 7 or 107.

Next, operation of the first embodiment of the present invention will be described. In FIG. 1, when the receiver is normally operating without failure, the switch circuits 6 and 106 select the outputs from the demodulation circuits 5A and 105A in the receiving demodulation units 20A and 120A of the working system 1 and working system 2 and output them to the data output terminals 7 and 107. The switch circuits 9A and 109A select output from the REF oscillation circuit 8A and output it, and the switch circuits 9B and 109B select output from the REF oscillation circuit 8B and output it.

If the REF oscillation circuit 8A has a failure, the switch circuits 9A and 109A select output from the REF oscillation circuit 108A and output it under the control of a control circuit (not shown) to recover the REF oscillation circuit 8A. Here, the switch circuits 6 and 106 are not switched. Similarly, if the REF oscillation circuit 8B has a failure, the switch circuits 9B and 109B select output from the REF oscillation circuit 108B and output it under the control of the control circuit.

If at least either the frequency converting circuit or the demodulation circuit of the receiving demodulation unit 20A or the receiving demodulation unit 120A has a failure, the switch circuits 6 and 106 select the outputs from the demodulation circuits 5B and 105B of the receiving demodulation units 20B and 120B and output them to the data output terminals 7 and 107 to recover the circuit.

As mentioned above, as the first embodiment of the present invention is adapted to provide the receiving demodulation unit of the working system and the receiving demodulation unit of the backup system for each of the V polarized wave signal and the H polarized wave signal, it can realize the dual-polarized wave transmission by using two hot standby. That is to say, the first embodiment can realize double capacity of transmission for a frequency than in the configuration of Japanese Patent No. 3044633. As the first embodiment uses the cross polarization interference canceller, it can reserve enough link quality even if the first embodiment of the present invention is applied to a communication system using a multi-valued modulating scheme.

As configuration of the frequency converting circuit, the switch circuit, the demodulation circuit (the cross polarization interference canceller) and the like shown in FIG. 1 is well-known and does not directly relate to the present invention, detailed description of them will be omitted.

As mentioned above, if at least either of the frequency converting circuit 4A and the demodulation circuit 5A in the receiving demodulation unit 20A of the working system 1 has a failure in the dual-polarization receiver shown in FIG. 1, for example, the switch circuits 6 and 106 select the outputs from the demodulation circuits 5B and 105B in the receiving demodulation units 20B and 120B of the backup system 1 and backup system 2. In such a case, as the receiving demodulation unit 120A of the working system 2 does not have a failure, the switch circuit 106 is desired to select the output from the demodulation circuit 105A and output it without performing the switching operation.

When the switch circuit 106 selects output from the demodulation circuit 105A and outputs it and the switch circuit 6 selects output from the demodulation circuit 5B and outputs it, however, as the RF local oscillation circuits of the frequency converting circuits 4B and 104A are not connected with the common REF oscillation circuit, the synchronization of radio frequency is not assured. Therefore, the cross polarization interference cancellers of the demodulation circuits 5B and 105A cannot operate.

That a radio frequency needs to be synchronized for operating a cross polarization interference canceller is well-known and also detailed in Japanese Patent Laid-Open No. 2002-158630, it will not be described here.

Next, a second embodiment of the present invention will be described. The second embodiment of the present invention enables one of the polarized wave signals to keep using the working system even if the system for the other of the polarized wave signals is switched from the working system to the backup system.

Figure 2:
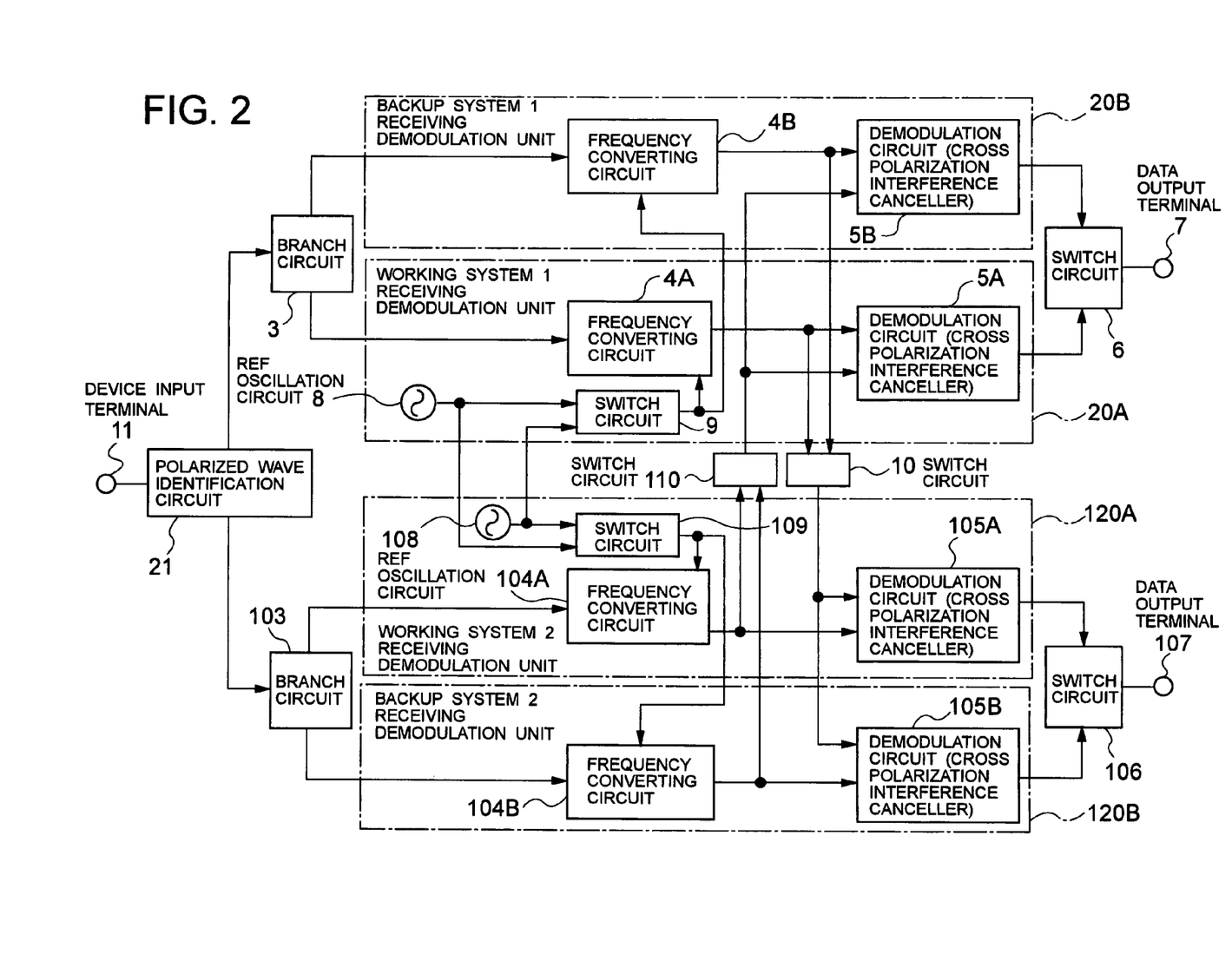
FIG. 2 is a diagram showing configuration of a dual-polarization receiver according to the second embodiment of the present invention.

FIG. 2 is a diagram showing configuration of a dual-polarization receiver in a hot standby transmission scheme using a dual-polarized wave signal transmission according to the second embodiment of the present invention. The same parts as those in FIG. 1 are denoted by the same reference numbers and characters. As shown in FIG. 2, in the dual-polarization receiver according to the second embodiment of the present invention, the switch circuits 9 and 109 supply output (reference signal) from either the REF oscillation circuits 8 or 108 to the frequency converting circuits 4A, 4B, 104A and 104B. That is to say, the frequency converting circuits 4A, 4B, 104A and 104B are supplied with output from the same REF oscillation circuit. Therefore, the RF local oscillation circuits of the frequency converting circuits 4A, 4B, 104A and 104B are connected to the common REF oscillation circuit and are synchronized.

The REF oscillation circuits 8 and 108 and the switch circuits 9 and 109 may be provided for outside the receiving demodulation units 20A and 120A.

A switch circuit 10 outputs one of the outputs from the frequency converting circuits 4A and 4B to the demodulation circuits 105A and 105B. A switch circuit 110 outputs one of the outputs from the frequency converting circuits 104A and 104B to the demodulation circuits 5A and 5B.

Next, operation of the second embodiment of the present invention will be described. In FIG. 2, when the receiver is normally operating without failure, the switch circuits 6 and 106 select the outputs from the demodulation circuits 5A and 105A in the receiving demodulation units 20A and 120A of the working system 1 and working system 2 and output them to the data output terminals 7 and 107. The switch circuits 9 and 109 select output from the REF oscillation circuit 8 and output it. The switch circuits 10 and 110 select the outputs from the frequency converting circuits 4A and 104A and output them.

If the REF oscillation circuit 8 has a failure, the switch circuits 9 and 109 select output from the REF oscillation circuit 108 and output it under the control of a control circuit (not shown) to recover the REF oscillation circuit 8. Here, the switch circuits 6 and 106 are not switched.

If the frequency converting circuit 4A in the receiving demodulation unit 20A of the working system 1 has a failure, the switch circuit 6 selects output from the demodulation circuit 5B in the receiving demodulation unit 20B of the backup system 1 and outputs it to the data output terminal 7, and the switch circuit 10 selects output from the frequency converting circuit 4B and output it under the control of the control circuit. As the frequency converting circuit 4B is connected with the REF oscillation circuit 8 as the frequency converting circuit 104A is, and output from the frequency converting circuit 4B is supplied for the demodulation circuit 105A, the demodulation circuits 5B and 105A can perform compensation of interference between cross polarized waves. Therefore, data can be transmitted without any problem.

If the demodulation circuit 5A in the receiving demodulation unit 20A of the working system 1 has a failure, the demodulation circuits 5B and 105A can perform compensation of interference between cross polarized waves without any problem by switching only the switch circuit 6, i.e., by only requiring the switch circuit 6 to select output from the demodulation circuit 5B and output it. The switch circuit 10 may be adapted to switch similar to the case where the frequency converting circuit 4A has a failure for simplification of the control logic.

If the frequency converting circuit 104A in the receiving demodulation unit 120A of the working system 2 has a failure, the switch circuit 106 selects output from the demodulation circuit 105B in the receiving demodulation unit 120B of the backup system 2 and outputs it to the data output terminal 107, and the switch circuit 110 selects output from the frequency converting circuit 104B and outputs it under the control of the control circuit. As the frequency converting circuit 104B is connected with the REF oscillation circuit 8 as the frequency converting circuit 4A is, and output from the frequency converting circuit 104B is supplied to the demodulation circuit 5A, the demodulation circuits 5A and 105B can perform compensation of interference between cross polarized waves. Therefore, data can be transmitted without any problem.

If the demodulation circuit 105A in the receiving demodulation unit 120A of the working system 2 has a failure, the demodulation circuits 5A and 105B can perform compensation of interference between cross polarized waves without any problem by switching only the switch circuit 106, i.e., by only requiring the switch circuit 106 to select output from the demodulation circuit 105B and output it. The switch circuit 110 may be adapted to switch similar to the case where the frequency converting circuit 104A has a failure for simplification of the control logic.

As mentioned above, the second embodiment of the present invention enables one of the polarized wave signals to keep using the working system even if the system for the other of the polarized wave signals is switched from the working system to the backup system.

Figure 3:
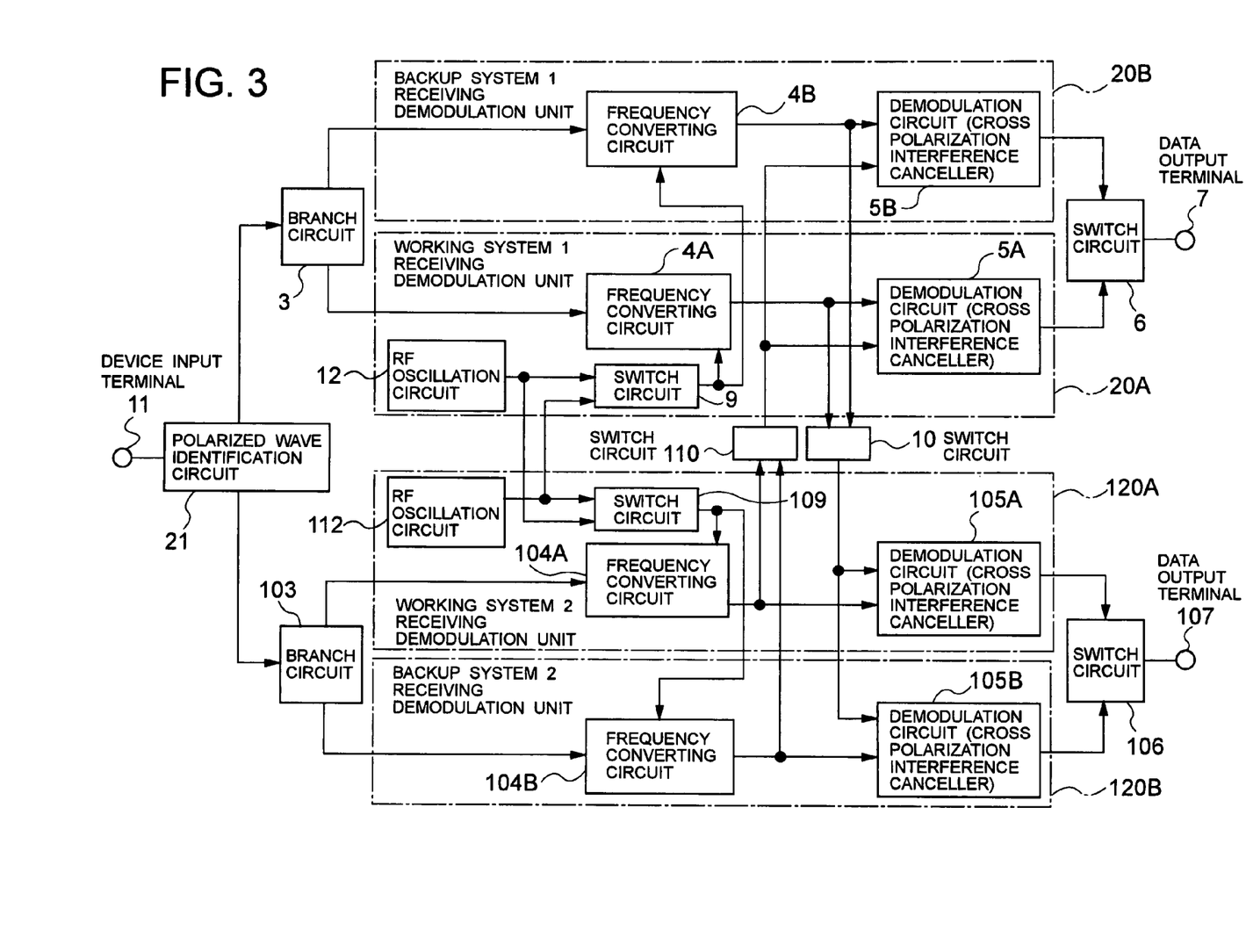
FIG. 3 is a diagram showing configuration of a dual-polarization receiver according to the third embodiment of the present invention.

Next, a third embodiment of the present invention will be described. FIG. 3 is a diagram showing configuration of a dual-polarization receiver in a hot standby transmission scheme using a dual-polarized wave signal transmission according to the third embodiment of the present invention. The same parts as those in FIG. 2 are denoted by the same reference numbers and characters.

As shown in FIG. 3, the third embodiment of the present invention has RF oscillation circuits 12 and 112 instead of the REF oscillation circuits 8 and 108 and the frequency converting circuits 4A, 4B, 104A and 104B have no RF local oscillation circuit, while the frequency converting circuits 4A, 4B, 104A and 104B shown in FIG. 2 have the RF local oscillation circuits.

Figure 4:
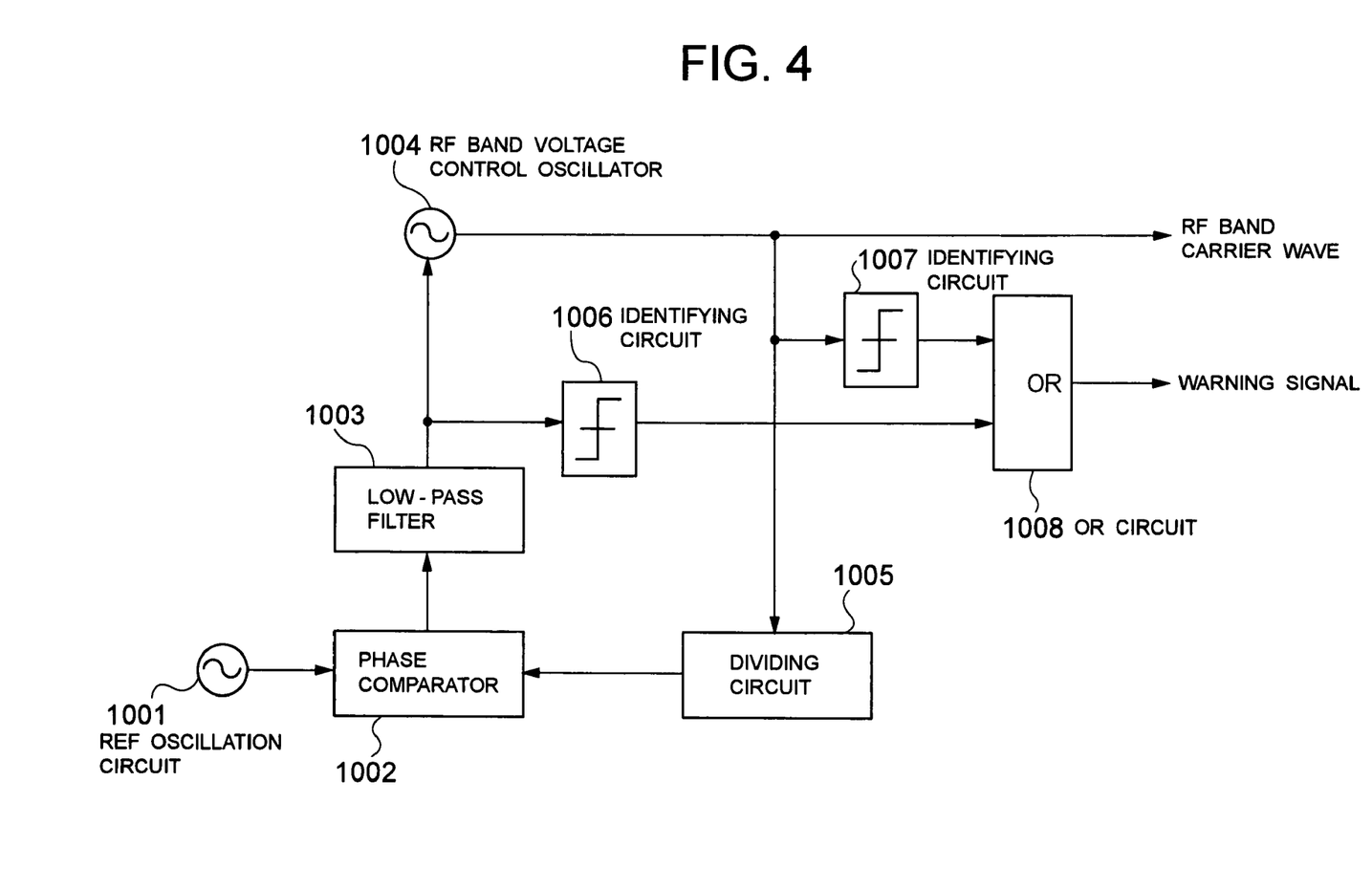
FIG. 4 is a diagram showing configuration of an RF oscillation circuit in FIG. 3.

FIG. 4 shows configuration of each of the RF oscillation circuits 12 and 112. In FIG. 4, each of the RF oscillation circuits 12 and 112 has an REF oscillation circuit 1001, a phase comparator 1002, a low-pass filter 1003, an RF band voltage control oscillator 1004, a dividing circuit 1005, identifying circuits 1006 and 1007, and an OR circuit 1008.

The REF oscillation circuit 1001 corresponds to each of the REF oscillation circuits 8 and 108 in FIG. 2. The dividing circuit 1005 divides output from the RF band voltage control oscillator 1004. The phase comparator 1002 compares phases of the output from the dividing circuit 1005 and the reference signal and outputs a control signal for the RF band voltage control oscillator 1004. The identifying circuit 1006 detects asynchronous of RF band carrier wave, which is an output from the RF band voltage control oscillator 1004. The identifying circuit 1007 detects output failure.

When any of the failure is detected by the identifying circuits 1006 and 1007, the OR circuit 1008 outputs a warning signal indicating failure in the RF oscillation circuit to a control circuit (not shown), which controls each of the switch circuits in FIG. 3. The RF band carrier wave (local oscillation signal), which is an output from the RF band voltage control oscillator 1004, is outputted to the switch circuits 9 and 109 in FIG. 3.

In FIG. 3, the switch circuits 9 and 109 supply output (local oscillation signal) from either the RF oscillation circuit 12 or 112 to the frequency converting circuits 4A, 4B, 104A and 104B. That is to say, the frequency converting circuits 4A, 4B, 104A and 104B are supplied with output from the same RF oscillation circuit. The RF oscillation circuits 12 and 112, and the switch circuits 9 and 109 may be provided for outside the receiving demodulation units 20A and 120A.

For example, if the RF oscillation circuit 12 has a failure when output from the RF oscillation circuit 12 is selected by the switch circuits 9 and 109, the switch circuits 9 and 109 select output from the RF oscillation circuit 112 and outputs it to recover the RF oscillation circuit 12 under the control of the control circuit. The embodiment takes the same operation in the case where the other devices have failure as that in the case of FIG. 2.

Figure 5:
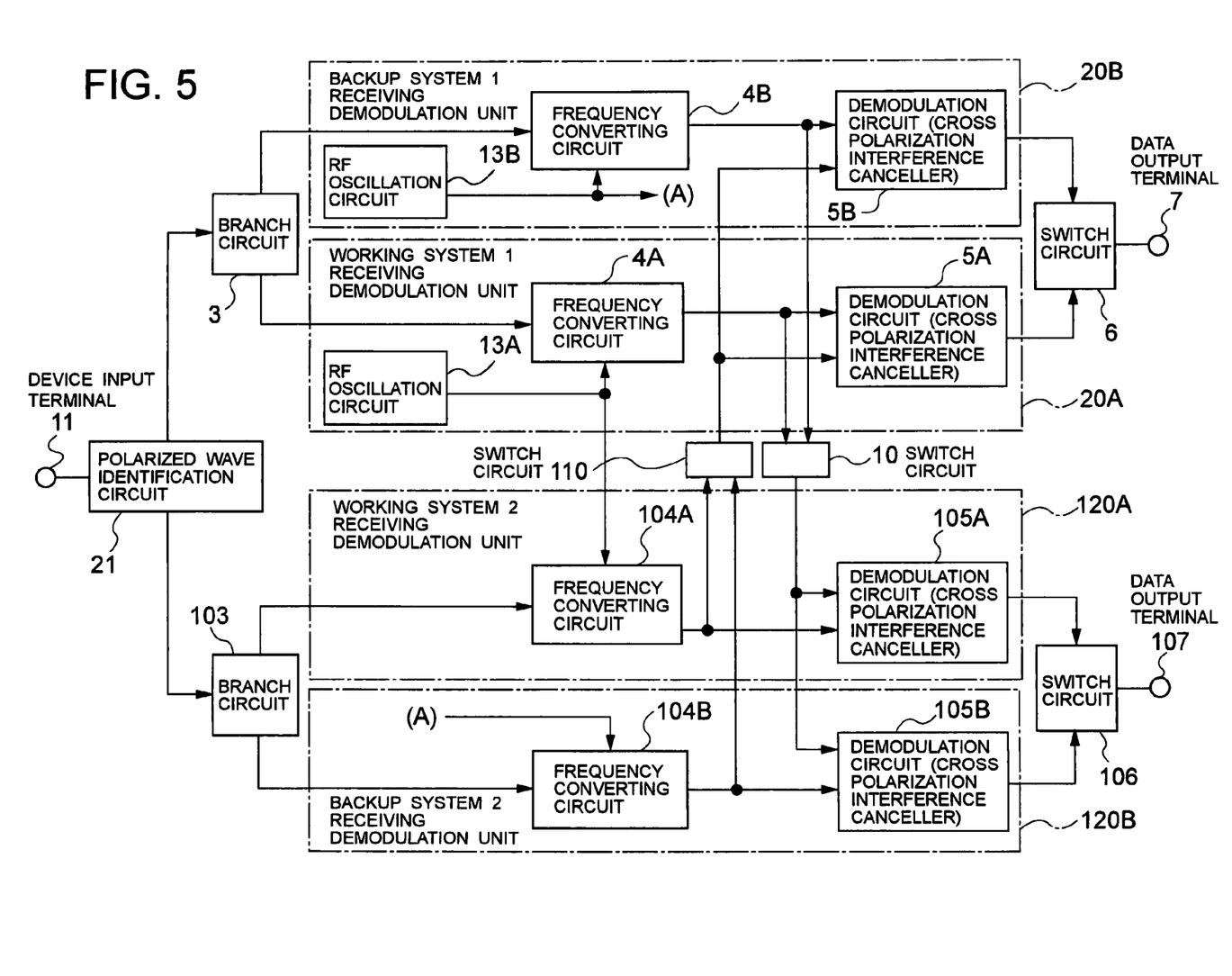
FIG. 5 is a diagram showing configuration of a dual-polarization receiver according to the fourth embodiment of the present invention.

Next, a fourth embodiment of the present invention will be described. FIG. 5 is a diagram showing configuration of a dual-polarization receiver in a hot standby transmission scheme using a dual-polarized wave signal transmission according to the fourth embodiment of the present invention. The same parts as those in FIG. 3 are denoted by the same reference numbers and characters.

In FIG. 5, the RF oscillation circuits 13A and 13B have the same configuration as that shown in FIG. 4. Output (local oscillation signal) from the RF oscillation circuit 13A is supplied to the frequency converting circuits 4A and 104A, and output (local oscillation signal) from the RF oscillation circuit 13B is supplied to the frequency converting circuits 4B and 104B. The RF oscillation circuits 13A and 13B may be provided for outside the receiving demodulation units 20A and 20B.

In the fourth embodiment of the present invention, when the RF oscillation circuit 13A has a failure, the frequency converting circuits 4A and 104A become inoperable. In such a case, the switch circuits 6 and 106 select output from the demodulation circuits 5B and 105B and output it and the switch circuits 10 and 110 select output from the frequency converting circuits 4B and 104B and output it under the control of the control circuit (not shown). If at least either the frequency converting circuit or the demodulation circuit of the receiving demodulation unit 20A or the receiving demodulation unit 120A has a failure, the embodiment takes the same operation as that taken in the case where the RF oscillation circuit 13A has a failure.

As the RF oscillation circuits 13A and 13B are used in FIG. 5, it is a matter of course that the RF oscillation circuits 13A and 13B can be substituted by REF oscillation circuits and the frequency converting circuits 4A, 4B, 104A and 104B may be adapted to have RF local oscillation circuits.

What is claimed is:

1. A dual-polarization receiver for receiving polarized wave signals whose directions are different from each other; comprising:
   a polarized wave identification circuit that identifies the polarized wave signals whose directions are different from each other and outputs each polarized wave signal independently;
   a working system receiving demodulation unit for each of said polarized wave signals receiving the respective polarized wave signal from the polarize wave identification circuit; and
   a respective backup system receiving demodulation unit for each of said working system receiving demodulation units.

2. The dual-polarization receiver according to claim 1, wherein each of said receiving demodulation units comprises a frequency converting circuit for converting an inputted polarized wave signal to an intermediate frequency signal, and a demodulation circuit for demodulating an output signal from the frequency converting circuit of the receiving demodulation unit and cancelling interference between the polarized waves by receiving the output signal from the frequency converting circuit of the receiving demodulation unit and the output signal from the frequency converting circuit of the receiving demodulation unit of the same system as the receiving demodulation unit among the receiving demodulation units provided for the polarized wave signal different from that of the receiving demodulation unit.

3. The dual-polarization receiver according to claim 2, wherein local oscillation signals used for the frequency converting circuits of said receiving demodulation units are common.

4. The dual-polarization receiver according to claim 3, wherein each of the frequency converting circuits of said receiving demodulation units has a local oscillation circuit for outputting the local oscillation signal, and the local oscillation circuits of the frequency converting circuits of said receiving demodulation units are connected with a common reference oscillation circuit and are synchronized.

5. The dual-polarization receiver according to claim 3, comprising a first switching means for supplying one of the outputs from the frequency converting circuits of the receiving demodulation units of the working system and the backup system provided for one of said polarized wave signals to the demodulation circuits of the receiving demodulation units of the working system and the backup system provided for the other of said polarized wave signals, and supplying one of the outputs from the frequency converting circuits of the receiving demodulation units of the working system and the backup system provided for the other of said polarized wave signals to the demodulation circuits of the receiving demodulation units of the working system and the backup system provided for the one of said polarized wave signals;
  wherein the demodulation circuit of each of said receiving demodulation units receives the output signal from the frequency converting circuit of the receiving demodulation unit and the output signal supplied from said first switching means.

6. The dual-polarization receiver according to claim 5, wherein said first switching means selects the output from the frequency converting circuit of each of the receiving demodulation units of the working system for said polarized wave signals; and wherein when a failure occurs in either of the receiving demodulation units of the working system for said polarized wave signals, said first switching means selects the output from the frequency converting circuit of the receiving demodulation unit of the backup system corresponding to the receiving demodulation unit in which the failure occurs.

7. The dual-polarization receiver according to claim 5, further comprising a second switching means for outputting one of the outputs from the demodulation circuits of the receiving demodulation units of the working system and the backup system provided for one of said polarized wave signals, and outputting one of the outputs from the demodulation circuits of the receiving demodulation units of the working system and the backup system provided for the other of said polarized wave signals.

8. The dual-polarization receiver according to claim 7, wherein said second switching means selects the output from the demodulation circuit of each of the receiving demodulation units of the working system for said polarized wave signals; and wherein when a failure occurs in either of the receiving demodulation units of the working system for said polarized wave signals, said second switching means selects the output from the demodulation circuit of the receiving demodulation unit of the backup system corresponding to the receiving demodulation unit in which the failure occurs.

9. The dual-polarization receiver according to claim 2, wherein a common local oscillation signal is used for the frequency converting circuits of the receiving demodulation units of the working system for said polarized wave signals and a common local oscillation signal is used for the frequency converting circuits of the receiving demodulation units of the backup system for said polarized wave signals; and further comprising
  first switching means for supplying one of the outputs from the frequency converting circuits of the receiving demodulation units of the working system and the backup system provided for one of said polarized wave signals to the demodulation circuits of the receiving demodulation units of the working system and the backup system provided for the other of said polarized wave signals, and supplying one of the outputs from the frequency converting circuits of the receiving demodulation units of the working system and the backup system provided for the other of said polarized wave signals to the demodulation circuits of the receiving demodulation units of the working system and the backup system provided for the one of said polarized wave signals.

10. The dual-polarization receiver according to claim 9, wherein said first switching means selects the output from the frequency converting circuit of each of the receiving demodulation units of the working system for said polarized wave signals; and wherein when a failure occurs in either of the receiving demodulation units of the working system for said polarized wave signals or in either of the frequency converting circuits of the receiving demodulation units of the working system for said polarized wave signals, said first switching means selects the output from the frequency converting circuit of each of the receiving demodulation units of the backup system for said polarized wave signals.

11. The dual-polarization receiver according to claim 9, further comprising a second switching means for outputting one of the outputs from the demodulation circuits of the receiving demodulation units of the working system and the backup system provided for one of said polarized wave signals, and outputting one of the outputs from the demodulation circuits of the receiving demodulation units of the working system and the backup system provided for the other of said polarized wave signals.

12. The dual-polarization receiver according to claim 11, wherein said second switching means selects the output from the demodulation circuit of each of the receiving demodulation units of the working system for said polarized wave signals; and wherein when a failure occurs in either of the receiving demodulation units of the working system for said polarized wave signals or in either of the frequency converting circuits of the receiving demodulation units of the working system for said polarized wave signals, said second switching means selects the output from the demodulation circuit of each of the receiving demodulation units of the backup system for said polarized wave signals.

13. A dual-polarization receiver for receiving polarized wave signals whose directions are different from each other; said receiver comprising:
  a polarized wave identification circuit that identifies the polarized wave signals and outputs each polarized wave signal;
  a plurality of working system demodulation units with one of said working systems receiving a respective one of said polarized wave signals;
  a respective backup system demodulation unit for each one of the working system demodulation units.

* * * * *